J. M. HUGHES AND C. H. LYONS.
STORAGE HOUSE AND BIN.
APPLICATION FILED JULY 14, 1919.
1,322,019.
Patented Nov. 18, 1919.
2 SHEETS—SHEET 1.
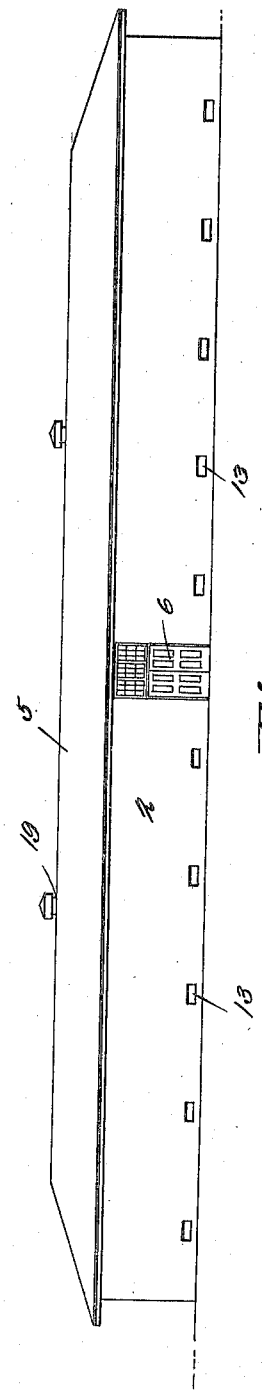
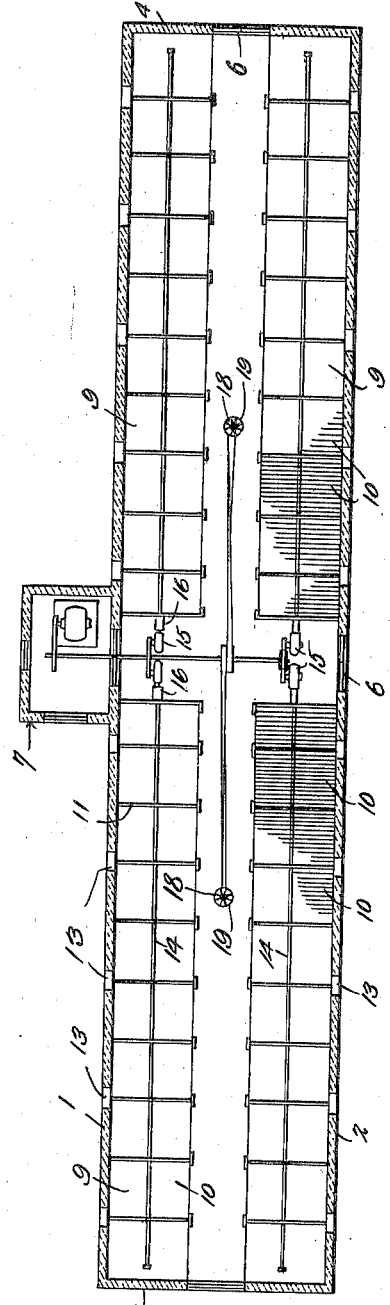
INVENTORS:
James M. Hughes & Charlton H. Lyons,
BY
ATTORNEY.

UNITED STATES PATENT OFFICE.

JAMES M. HUGHES AND CHARLTON H. LYONS, OF WINNFIELD, LOUISIANA.

STORAGE HOUSE AND BIN.

1,322,019.　　　　　Specification of Letters Patent.　　Patented Nov. 18, 1919.

Application filed July 14, 1919. Serial No. 310,765.

*To all whom it may concern:*

Be it known that we, JAMES M. HUGHES, and CHARLTON H. LYONS, citizens of the United States of America, and residents of Winnfield, in the parish of Winn and State of Louisiana, have invented certain new and useful Improvements in Storage Houses and Bins, of which the following is a specification.

This invention relates to storage houses and bins and particularly to a house or storage structure having novel means for drying vegetables, grain or the like and for ventilating the same to prevent its rotting, molding or deterioration. When recently harvested vegetation has been stored it often sweats or heats or becomes affected in other ways unless it is dried or ventilated and it is an object of this invention to provide novel means whereby air may be caused to circulate through a bin or compartment containing the vegetation.

While the invention is produced more particularly for treating and storing potatoes, we do not wish to be limited with respect to its use and hence in describing the invention it will be referred to as for treating "vegetation" and that term is intended to include farm products generally, capable of being housed or stored in a device of this character.

A further object of this invention is to provide novel means whereby the air so circulated may be heated to a predetermined temperature so that the drying effect of the air may be augmented and regulated.

A still further object of the invention is to provide novel means whereby air may be delivered under the vegetation and other means for carrying or drawing off the air rising therefrom.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of the device;

Fig. 2 illustrates a horizontal sectional view;

Figure 3:
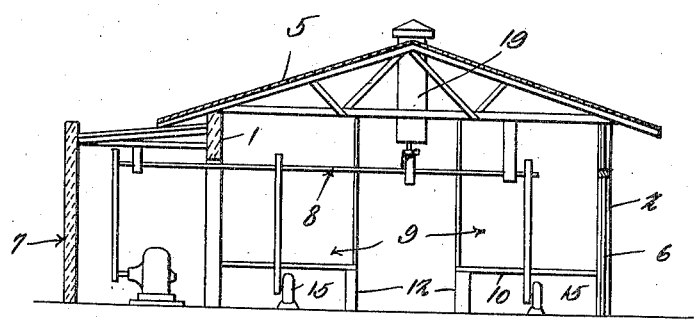
Fig. 3 illustrates a transverse sectional view.
Figure 4:
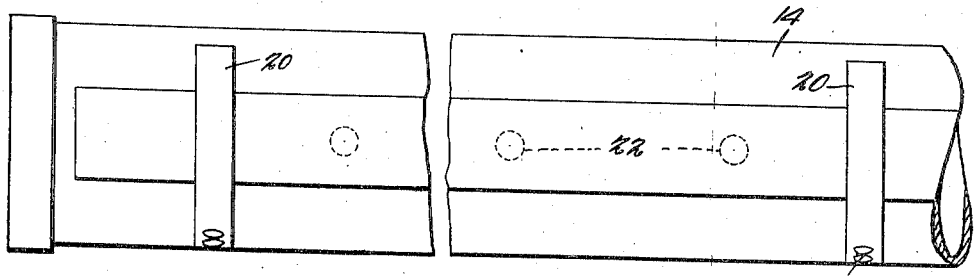
Fig. 4 illustrates a view in elevation of a fragment of pipe.
Figure 5:
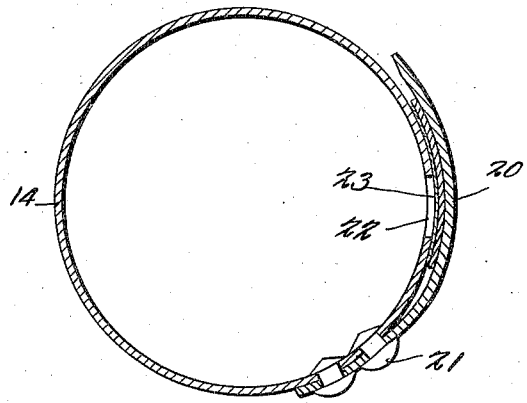
Fig. 5 illustrates a transverse sectional view thereof.

In these drawings 1 and 2 denote the side walls of a structure, 3 and 4 the end walls thereof and 5 a roof, and of course suitable air tight doors 6 may be stationed at convenient positions. A power house 7 may adjoin the structure and the interior may be supplied with suitable power transmitting shafting, belting and the like designated generally by the numeral 8.

A series of bins 9 are arranged, preferably at each side of the center, and the said bins have slatted bottoms 10 and closed partitions 11 extending from the bottom of the bin to the ground. The side walls have ventilating doors 13 set therein opening inside the building into the compartments under the slatted floors of the bins and perforated pipes such as 14 are situated in the said compartments under the bins and extend preferably from the longitudinal center of the building toward its ends. The inner end of each of said pipes is connected to a commercial blower 15 of proper capacity for delivering air under pressure to the compartments under the bins so that said air will be circulated through the contents of the bins and escape in a manner to be presently explained.

Figure 6:
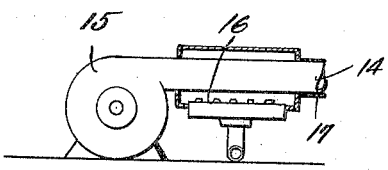
Fig. 6 illustrates a view in elevation, partly in section of air circulating and heating means.

A heating agent such as a vapor burner 16, conventionally shown in Fig. 6, may embrace each pipe in order that air may be heated to a predetermined temperature, and to prevent radiation, the unperforated portions of the pipes may be insulated with a covering 17.

Ordinary commercial ventilators 18 may be set in flues 19 leading through the roof and they may be coupled to be driven by the shafting, for improving the circulation of air and driving off the air rising through the vegetables.

Each pipe has a series of spring clips 20 secured to it, as by rivets 21 and these clips retain a plate in position with relation to the apertures 22 or perforations of the pipe, to increase or diminish the flow of air through said apertures. The plates each have a yieldable facing strip 23 preferably of felt which insures proper control of the air and the strips may be of any appropriate length and the clips may be so spaced apart that they will coöperate to retain the plate in different positions of adjustment.

A storage house built in accordance with the foregoing description insures that the air entering and leaving the building circulates through the vegetation in the bins; that there is a regular flow of heated air through the vegetation as the ceiling suction fans are constantly drawing the air from the building, thus forming a partial vacuum; which withdrawn air may be replaced by that drawn through the bins. Furthermore, there is a forced circulation of tempered air, regulated in degree of heat and volume to the requirements of the vegetation being treated (as essential for successful treatment of potatoes) all combining to produce advantageous results expeditiously attained and comparatively inexpensively.

We claim—

1. In a curing house, an inclosure having doors in its side near the ground, bins within the inclosure having slatted floors, means for supporting the slatted floors clear of the ground and forming compartments with which the door openings communicate for the admission of air, an air conducting pipe extending under the bins, said pipe having apertures therein for the escape of air, clips on the said pipe, plates held between the clips and the pipe for controlling the escape of air from the pipe, and means for supplying air to the pipe.

2. In a curing house, an inclosure having doors in its side near the ground, bins within the inclosure having slatted floors, means for supporting the slatted floors clear of the ground and forming compartments with which the door openings communicate for the admission of air, an air conducting pipe extending under the bins, said pipe having apertures therein for the escape of air, clips on the said pipe, plates held between the clips and the pipe for controlling the escape of air from the pipe, means for supplying air to the pipe, means for heating air passing through the pipe, and means for operating the means for supplying air to the pipe.

3. In a curing house, an inclosure having doors in its sides near the ground, bins within the inclosure having slatted floors, means for supporting the slatted floors clear of the ground and forming compartments with which the door openings communicate for the admission of air, an air conducting pipe extending under the bins, said pipe having apertures therein for the escape of air, clips on the said pipe, plates held between the clips and the pipe for controlling the escape of air from the pipe, means for supplying air to the pipe, and conduits leading from the interior to the exterior of the building, air agitating means in the said conduits and means for operating the air agitating means.

4. In a curing house, an inclosure having doors in its side near the ground, bins within the inclosure having slatted floors, means for supporting the slatted floors clear of the ground and forming compartments with which the door openings communicate for the admission of air, an air conducting pipe extending under the bins, said pipe having apertures therein for the escape of air, clips on the said pipe, plates held between the clips and the pipe for controlling the escape of air from the pipe, said plates having yieldable facings to close the openings in the pipe.

JAMES M. HUGHES.
CHARLTON H. LYONS.